United States Patent
Yin et al.

(10) Patent No.: US 10,437,473 B2
(45) Date of Patent: Oct. 8, 2019

(54) STORAGE SYSTEM AND METHOD FOR SCANNING FOR DEVICES

(71) Applicant: Huawei Technologies Co., Ltd., Shenzhen (CN)

(72) Inventors: Zesheng Yin, Chengdu (CN); Ming Chen, Chengdu (CN); Xiaofei Fu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 15/797,687

(22) Filed: Oct. 30, 2017

(65) Prior Publication Data
US 2018/0046380 A1 Feb. 15, 2018

Related U.S. Application Data
(63) Continuation of application No. PCT/CN2016/083701, filed on May 27, 2016.

(51) Int. Cl.
*G06F 3/06* (2006.01)
*G06F 13/42* (2006.01)
(Continued)

(52) U.S. Cl.
CPC .......... *G06F 3/0607* (2013.01); *G06F 3/0626* (2013.01); *G06F 3/0635* (2013.01);
(Continued)

(58) Field of Classification Search
None
See application file for complete search history.

(56) References Cited

U.S. PATENT DOCUMENTS

| 6,021,465 A * | 2/2000 | Brau ............... G06F 3/0601 711/114 |
| 8,774,055 B2 * | 7/2014 | Naven ............. G06F 13/404 370/255 |

(Continued)

FOREIGN PATENT DOCUMENTS

| CN | 1832489 A | 9/2006 |
| CN | 102508797 A | 6/2012 |

(Continued)

OTHER PUBLICATIONS

'PCI Express Base Specification Revision 3.0' Nov. 10, 2010. (Year: 2010).*

(Continued)

*Primary Examiner* — Steven G Snyder
(74) *Attorney, Agent, or Firm* — Conley Rose, P.C.

(57) ABSTRACT

A peripheral component interconnect express (PCIe) storage system includes N storage devices. Each storage device includes at least one processor, a switch, and at least one storage unit. The switch includes at least two uplink ports and at least two downlink ports. The at least two uplink ports include at least one first uplink port and a second uplink port, and each processor is coupled to the at least one first uplink port. The at least two downlink ports include at least one first downlink port and a second downlink port, and the at least one storage unit is coupled to the at least one first downlink port. A second downlink port of an $i^{th}$ storage device is coupled to a second uplink port of an $(i+1)^{th}$ storage device. A second downlink port of an $N^{th}$ storage device is coupled to a second uplink port of a first storage device.

20 Claims, 5 Drawing Sheets

(51) Int. Cl.
  *G06F 13/40*   (2006.01)
  *H04L 29/08*   (2006.01)
  *G06F 12/00*   (2006.01)
(52) U.S. Cl.
  CPC .......... *G06F 3/0653* (2013.01); *G06F 3/0685* (2013.01); *G06F 12/00* (2013.01); *G06F 13/404* (2013.01); *G06F 13/4022* (2013.01); *G06F 13/4282* (2013.01); *H04L 67/24* (2013.01); *G06F 2213/0026* (2013.01)

(56) References Cited

U.S. PATENT DOCUMENTS

| | | | | |
|---|---|---|---|---|
| 9,026,687 | B1* | 5/2015 | Govande | G06F 13/10 710/10 |
| 9,419,918 | B2* | 8/2016 | Egi | H04L 41/12 |
| 9,575,919 | B2* | 2/2017 | Akaike | G06F 3/06 |
| 10,061,707 | B2* | 8/2018 | Kutuva Rabindranath | G06F 12/10 |
| 10,191,882 | B2* | 1/2019 | Egi | G06F 13/4022 |
| 2008/0082969 | A1* | 4/2008 | Agha | G06F 11/3608 717/130 |
| 2008/0209436 | A1* | 8/2008 | Agha | G06F 11/3632 718/106 |
| 2008/0307161 | A1* | 12/2008 | Wei | G06F 3/0617 711/114 |
| 2009/0077297 | A1* | 3/2009 | Zhao | G06F 9/5011 710/314 |
| 2011/0069710 | A1* | 3/2011 | Naven | G06F 13/404 370/395.3 |
| 2011/0185163 | A1* | 7/2011 | Hidaka | G06F 13/4022 713/2 |
| 2011/0231707 | A1* | 9/2011 | Davenport | G06F 11/0775 714/37 |
| 2013/0179722 | A1* | 7/2013 | Smith | G06F 13/4027 714/4.5 |
| 2014/0007114 | A1* | 1/2014 | Wang | G06F 9/5027 718/102 |
| 2014/0173167 | A1* | 6/2014 | Choi | G06F 13/4022 710/316 |
| 2015/0026384 | A1* | 1/2015 | Maitra | G06F 13/4022 710/313 |
| 2015/0261709 | A1* | 9/2015 | Billi | G06F 13/4022 710/316 |
| 2015/0309951 | A1* | 10/2015 | Breakstone | G06F 13/4022 710/313 |
| 2016/0117281 | A1* | 4/2016 | Akaike | G06F 3/06 710/313 |
| 2016/0134564 | A1* | 5/2016 | Egi | H04L 41/12 370/401 |
| 2016/0378706 | A1* | 12/2016 | Egi | G06F 13/4022 710/313 |
| 2017/0185525 | A1* | 6/2017 | Kutuva Rabindranath | G06F 12/10 |
| 2018/0225054 | A1* | 8/2018 | Caporale | G06F 3/0631 |

FOREIGN PATENT DOCUMENTS

| | | | | |
|---|---|---|---|---|
| CN | 103543961 A | | 1/2014 | |
| CN | 103634277 A | | 3/2014 | |
| EP | 1615138 A2 | | 1/2006 | |
| EP | 2602960 A1 | | 6/2013 | |
| KR | 20130049720 A | * | 5/2013 | .......... G06F 3/0626 |
| WO | WO-2005114255 A2 | * | 12/2005 | .......... G01T 1/2985 |
| WO | WO-2010044409 A1 | * | 4/2010 | ........ G06F 13/4022 |
| WO | 2013103510 A1 | | 7/2013 | |
| WO | WO-2013103519 A1 | * | 7/2013 | ......... G06F 13/4247 |

OTHER PUBLICATIONS

'An Introduction to PCI Express' by Ravi Budruk, Mindshare, archived on May 14, 2015. (Year: 2015).*
Machine Translation and Abstract of Chinese Publication No. CN102508797, Jun. 20, 2012, 16 pages.
Machine Translation and Abstract of Chinese Publication No. CN103543961, Jan. 29, 2014, 18 pages.
Machine Translation and Abstract of Chinese Publication No. CN103634277, Mar. 12, 2014, 25 pages.
Foreign Communication From a Counterpart Application, PCT Application No. PCT/CN2016/083701, English Translation of International Search Report dated Feb. 16, 2017, 2 pages.
Foreign Communication From a Counterpart Application, European Application No. 16890129.6, European Office Action dated Jan. 14, 2019, 7 pages.
Foreign Communication From a Counterpart Application, European Application No. 16890129.6, Extended European Search Report dated Apr. 30, 2018, 9 pages.

* cited by examiner

S310 A current processing unit scans for devices that can be accessed by the current processing unit S320 Record, in the scanning process, a connection relationship between scanned devices found by the current processing unit, and generate a PCIe tree for the current processing unit according to the recorded connection relationship

STORAGE SYSTEM AND METHOD FOR SCANNING FOR DEVICES

CROSS-REFERENCE TO RELATED APPLICATION

This application is a continuation of International Patent Application No. PCT/CN2016/083701 filed on May 27, 2016, which is hereby incorporated by reference in its entirety.

TECHNICAL FIELD

Embodiments of the present application relate to the storage field, and in particular, to a storage system and a method for scanning for devices.

BACKGROUND

Figure 1:
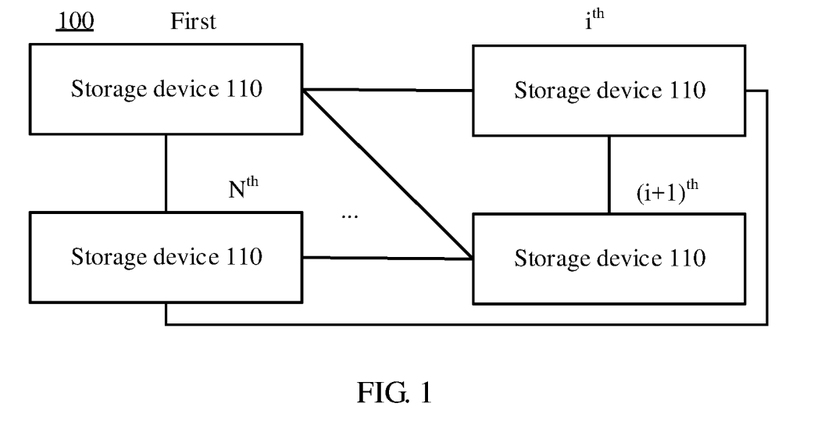
FIG. 1 is a schematic architecture diagram of a storage system.

A storage system, for example, a peripheral component interconnect express (PCIe) storage system, may include multiple storage devices, and the multiple storage devices may be connected in a pairwise way. For example, as shown in FIG. 1, a storage system 100 includes N storage devices 110. There is a direct link between any two storage devices 110 of the N storage devices 110, and the direct link between the any two storage devices 110 may be used for mutual communication. Therefore, there are N×(N−1)/2 direct links between the N storage devices in the storage system 100. A larger quantity of storage devices included in the storage system, namely a larger numerical value of N, indicates a larger quantity of direct links in the storage system, leading to a complex link structure.

SUMMARY

Embodiments of the present application provide a storage system and a method for scanning for devices in order to reduce system complexity and construction costs.

According to a first aspect, a storage system is provided, including N storage devices connected in a ring shape, where each storage device includes at least one processing unit, a switch unit, and at least one storage unit, and the switch unit includes at least two uplink ports and at least two downlink ports. The at least two uplink ports include at least one first uplink port and at least one second uplink port, and the at least one processing unit is connected to the at least one first uplink port. The at least two downlink ports include at least one first downlink port and at least one second downlink port, and the at least one storage unit is connected to the at least one first downlink port, and in the N storage devices, a second downlink port of an $i^{th}$ storage device is connected to a second uplink port of an $(i+1)^{th}$ storage device, a second downlink port of an $N^{th}$ storage device is connected to a second uplink port of a first storage device, $i=1, \ldots,$ and $N-1$, and $N \geq 2$.

Optionally, the storage system is a PCIe storage system. In this case, the at least two uplink ports may be PCIe uplink ports, and the at least two downlink ports may be PCIe downlink ports.

Therefore, according to the storage system provided in this embodiment of the present application, N storage devices are connected in a head-to-tail way to form a ring connection structure such that any two storage devices of the N storage devices can communicate with each other. Compared with that storage devices are directly connected in a pairwise way in other approaches, in the present application, physical link complexity and construction costs of the system can be reduced.

In a first possible implementation manner of the first aspect, there is a connection link between any downlink port of the at least two downlink ports and any uplink port of the at least two uplink ports.

In this case, the at least two downlink ports all are shared downlink ports. Correspondingly, at least one storage unit of the storage device is a shared storage unit, that is, the at least one storage unit can be shared by all processing units of the storage device.

In this way, a downlink port of a switch unit is set as a shared port such that the storage unit can be shared by all processing units in the system. In addition, a processing unit may directly perform a read/write operation on any storage unit in the system, with no need to interact with another processing unit, thereby simplifying a data read/write procedure of the processing unit, reducing processing resources of the processing unit, and improving data read/write efficiency. In addition, the processing unit may manage all resources of each storage unit in the storage system, helping to improve overall performance of the system.

Optionally, there is a connection link between the at least two uplink ports.

With reference to the foregoing possible implementation manner, in a second possible implementation manner of the first aspect, the processing unit is configured to scan for devices that can be accessed by the processing unit, and record, in the scanning process, a connection relationship between devices scanned by the processing unit, and generate a PCIe tree for the processing unit according to the recorded connection relationship.

With reference to the foregoing possible implementation manner, in a third possible implementation manner of the first aspect, during scanning for the devices that can be accessed, the processing unit is further configured to scan for, according to a depth-first search (DFS) algorithm, devices connected to the processing unit.

Optionally, the processing unit is further configured to determine whether a scanned device has been scanned by the processing unit before, and return to a device connected to an uplink port of the scanned device, and perform scanning if the scanned device has been scanned by the processing unit before.

Further, the device connected to the uplink port of the scanned device may be a device connected in an uplink direction to the scanned device.

Optionally, if a device is repeatedly scanned, the processing unit may return to an uplink device of the device and continue scanning.

Optionally, the processing unit is further configured to determine that the scanned device is a switch unit directly connected to the processing unit if the scanned device has been scanned by the processing unit before.

Optionally, the processing unit is further configured to return to an upper-level switch unit connected to an uplink port of the scanned device, and scan for devices that are connected to the upper-level switch unit and that have not been scanned by scanning if the scanned device has been scanned by the processing unit.

Optionally, after all devices connected to the upper-level switch unit have been scanned, the processing unit is further configured to return to an upper-level switch unit connected to an uplink port of the upper-level switch unit connected to all the devices, and scan for devices that have not been scanned, until all devices connected to all switch units connected to the processing unit have been scanned.

Optionally, if a device is scanned for the first time, the processing unit may assign a device address to the device and scan for, in a downlink direction, devices connected to the device. Optionally, the processing unit may add, to a device address set for the processing unit, the device address assigned to the device.

Optionally, the uplink direction may be a direction near the processing unit, and the downlink direction may be a direction far from the processing unit.

With reference to the foregoing possible implementation manner, in a fourth possible implementation manner of the first aspect, the processing unit is further configured to determine whether a device address has been assigned to the scanned device, determine whether a device address assigned to the scanned device exists in the device address set corresponding to the processing unit if the device address has been assigned to the scanned device, where the device address set corresponding to the processing unit includes a device address assigned to each device of at least one scanned device by the processing unit, and determine that the scanned device has been scanned by the processing unit if a device address assigned to the scanned device exists in the device address set corresponding to the processing unit.

With reference to the foregoing possible implementation manner, in a fifth possible implementation manner of the first aspect, the processing unit is further configured to assign a device address to the scanned device, and add the assigned device address to the device address set corresponding to the processing unit if no device address has been assigned to the scanned device.

In this case, optionally, the processing unit may continue to scan for devices connected to the scanned device.

Optionally, the processing unit is further configured to add, to the device address set corresponding to the processing unit, the device address assigned to the scanned device if the device address assigned to the scanned device does not exist in the device address set corresponding to the processing unit.

With reference to the fifth possible implementation manner of the first aspect, in a seventh possible implementation manner of the first aspect, the processing unit is further configured to send a verification message after generating a PCIe tree for the processing unit, where a destination address for the verification message is a device address of an outermost leaf node device in the PCIe tree, a root node in the PCIe tree is the processing unit, and the outermost leaf node in the PCIe tree is a node farthest from the processing unit in the PCIe tree, and determine that the PCIe tree has been created successfully if the processing unit receives the verification message.

With reference to the fifth possible implementation manner of the first aspect, in an eighth possible implementation manner of the first aspect, the processing unit is further configured to determine a device repeatedly scanned in a scanning process used to generate the PCIe tree if the processing unit does not receive the verification message, assign, to the device repeatedly scanned, a new device address different from a current device address of the device repeatedly scanned by scanning, and replace the current device address with the new device address in the device address set corresponding to the processing unit, and set the device repeatedly scanned as a start point to scan for devices connected to the device repeatedly scanned, record, in the scanning process, a connection relationship between scanned devices, and generate a new PCIe tree for the processing unit according to the recorded connection relationship.

According to a second aspect, a method for scanning for devices is provided, and may be applied to the PCIe storage system according to the first aspect or any possible implementation manner of the first aspect, where the method includes scanning for, by a current processing unit of N storage devices connected in a ring shape, devices that can be accessed by the current processing unit, and recording, in the scanning process, a connection relationship between scanned devices by the current processing unit, and generating a PCIe tree for the current processing unit according to the recorded connection relationship between the scanned devices.

In a first possible implementation manner of the second aspect, the scanning for devices that can be accessed by the current processing unit includes scanning for, according to a DFS algorithm, devices directly or indirectly connected to the current processing unit.

Optionally, the scanning for devices that can be accessed by the current processing unit includes returning to a device connected to an uplink port of the scanned device, and performing scanning if a scanned device has been scanned by the current processing unit before.

Further, if the scanned device has been scanned by the current processing unit, the current processing unit determines that the scanned device is a switch unit directly connected to the current processing unit, returns to an upper-level switch unit connected to an uplink port of the switch unit directly connected to the current processing unit, and scans for devices that are connected to the upper-level switch unit and that have not been scanned, and after all devices connected to the upper-level switch unit have been scanned, returns to an upper-level switch unit connected to an uplink port of the upper-level switch unit connected to all the devices, and scans for devices that have not been scanned, until all devices connected to all switch units in the storage system have been scanned.

With reference to the foregoing possible implementation manner, in a second possible implementation manner of the second aspect, determining that a scanned device scanned by the current processing unit before includes determining whether a device address has been assigned to the scanned device, determining whether the device address assigned to the scanned device exists in a device address set corresponding to the current processing unit if a device address has been assigned to the scanned device, where the device address set corresponding to the current processing unit includes a device address assigned to each device of at least one device that has been scanned by the current processing unit, and determining that the scanned device has been scanned by the current processing unit before if the device address assigned to the scanned device exists in the device address set corresponding to the current processing unit.

With reference to the foregoing possible implementation manner, in a third possible implementation manner of the second aspect, scanning for devices that can be accessed by the current processing unit further includes assigning a device address to the scanned device, and adding the assigned device address to the device address set corresponding to the current processing unit if no device address has been assigned to the scanned device, and/or adding, to the device address set corresponding to the current processing unit, the device address assigned to the scanned device if the device address assigned to the scanned device does not exist in the device address set corresponding to the current processing unit.

With reference to the foregoing possible implementation manner, in a fourth possible implementation manner of the second aspect, after the PCIe tree is generated, the method further includes sending a verification message, where a destination address for the verification message is a device address of an outermost leaf node device in the PCIe tree, a root node in the PCIe tree is the current processing unit, and the outermost leaf node in the PCIe tree is a node farthest from the current processing unit in the PCIe tree, and determining that the PCIe tree has been created successfully if the current processing unit receives the verification message.

With reference to the foregoing possible implementation manner, in a fifth possible implementation manner of the second aspect, the method further includes determining a device repeatedly scanned in a scanning process used to generate the PCIe tree if the current processing unit does not receive the verification message, assigning, to the device repeatedly scanned, a new device address different from a current device address of the device repeatedly scanned, and replacing the current device address with the new device address in the device address set corresponding to the current processing unit, and setting the device repeatedly scanned as a start point to scan for devices connected to the device repeatedly scanned, recording, in the scanning process, a connection relationship between devices scanned, and generating a new PCIe tree for the current processing unit according to the recorded connection relationship.

In the method for scanning for devices according to this embodiment of the present application, a verification message is sent to verify whether a PCIe tree is correctly created, and a new PCIe tree is created when after it is determined that the current PCIe tree is incorrect. This can prevent an incorrect PCIe tree from being created and improve system performance.

In addition, in this embodiment of the present application, a device repeatedly scanned in a previous scanning process (that is, a device where scanning is interrupted) is used as a start point to perform scanning. This avoids repeated scanning starting from the first processing device, thereby increasing PCIe tree creation speed and efficiency, and further improving system performance.

According to a third aspect, a computer readable medium is provided, and configured to store a computer program, where the computer program includes an instruction used to execute the method according to the second aspect or any possible implementation manner of the second aspect.

BRIEF DESCRIPTION OF DRAWINGS

To describe the technical solutions in the embodiments of the present application more clearly, the following briefly describes the accompanying drawings required for describing the embodiments of the present application.

DESCRIPTION OF EMBODIMENTS

The following clearly and describes the technical solutions in the embodiments of the present application with reference to the accompanying drawings in the embodiments of the present application.

Figure 2:
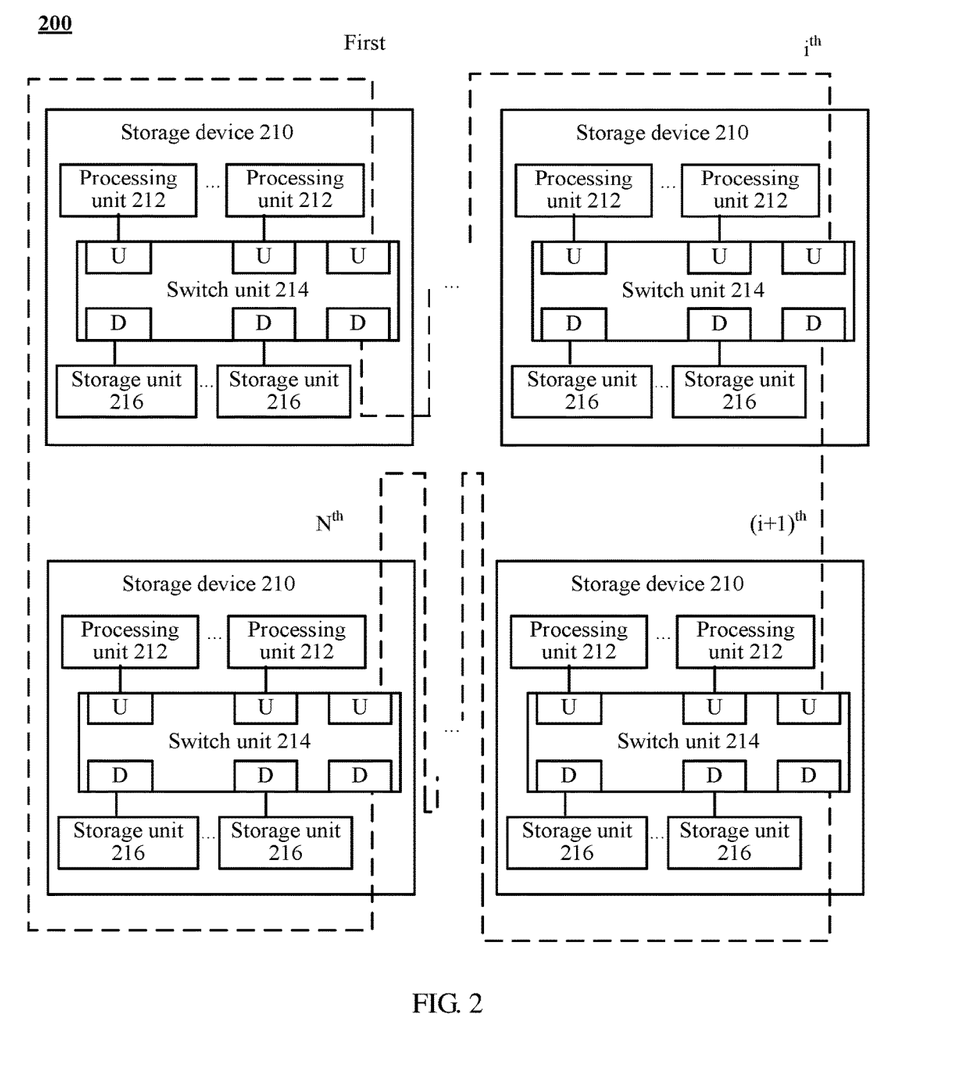
FIG. 2 is a schematic architecture diagram of a storage system according to an embodiment of the present application.

FIG. 2 is a schematic architecture diagram of a storage system 200 according to an embodiment of the present application. The storage system 200 includes N storage devices 210 connected in a ring shape, where N≥2, and each storage device 210 may include at least one processing unit 212, a switch unit 214, and at least one storage unit 216.

As shown in FIG. 2, the switch unit 214 may include at least two uplink ports (represented by U) and at least two downlink ports (represented by D). The at least two uplink ports may include at least one first uplink port and at least one second uplink port, and the at least one first uplink port may be connected to the at least one processing unit 212. The at least two downlink ports may include at least one first downlink port and at least one second downlink port, and the at least one first downlink port may be connected to the at least one storage unit 216.

In a ring connection structure of the N storage devices, a second downlink port of a switch unit of an $i^{th}$ storage device 210 may be connected to a second uplink port of a switch unit of an $(i+1)^{th}$ storage device 210, and a second downlink port of a switch unit of an $N^{th}$ storage device 210 may be connected to a second uplink port of a switch unit of a first storage device 210, where i=1, . . . , and N−1.

Optionally, the storage system 200 may be a PCIe storage system. In this case, the PCIe storage system may include N PCIe storage devices 210. A switch unit 214 of a PCIe storage device 210 may be a PCIe switch unit. The PCIe switch unit may be connected to a processing unit 212 and a storage unit 216 respectively using a PCIe uplink port and a PCIe downlink port. Optionally, the processing unit 212 may be used as a primary PCIe device, and the storage unit 216 may be used as a secondary PCIe device. However, this is not limited in this embodiment of the present application.

The switch unit 214 may include a switch chip and may include multiple uplink ports and multiple downlink ports. The multiple uplink ports may include at least one first uplink port and one or more second uplink ports. The first uplink port may be an uplink port configured to connect to the processing unit 212 of the same storage device 210, and the one or more second uplink ports may be an uplink port or uplink ports configured to connect to a downlink port or downlink ports of a switch unit 214 of another storage device 210. In addition, the multiple downlink ports may include at least one first downlink port and one or more second downlink ports. The first downlink port may be a downlink port configured to connect to the storage unit 216 of the same storage device 210, and the one or more second downlink ports may be a downlink port or downlink ports configured to connect to an uplink port or uplink ports of the switch unit 214 of the other storage device 210. However, this is not limited in this embodiment of the present application.

The processing unit 212 may include a CPU, and may be configured to connect to a first uplink port of the switch unit 214 of the storage device 210. In the storage device 210, a quantity of the at least one first uplink port of the switch unit 214 may be equal to a quantity of the at least one processing unit 212. In this case, the at least one first uplink port may be connected to the at least one processing unit 212 in a one-to-one correspondence. Alternatively, a quantity of the at least one first uplink port of the switch unit 214 may be not equal to a quantity of the at least one processing unit 212, for example, the quantity of the at least one first uplink port of the switch unit 214 is greater than the quantity of the at least one processing unit 212. In this case, some first uplink ports of the at least one first uplink port may be connected to the at least one processing unit 212 in a one-to-one correspondence, while the other first uplink ports may be idle. However, this is not limited in this embodiment of the present application.

The storage unit 216 may be configured to connect to a first downlink port of the switch unit 214 of the same storage device. Optionally, in the storage device 210, a quantity of the at least one first downlink port of the switch unit 214 may be equal to a quantity of the at least one storage unit 216. In this case, the at least one first downlink port may be connected to the at least one storage unit 216 in a one-to-one correspondence. Alternatively, a quantity of the at least one first downlink port of the switch unit 214 may be not equal to a quantity of the at least one storage unit 216, for example, the quantity of the at least one first downlink port of the switch unit 214 may be greater than the quantity of the at least one storage unit 216. In this case, some first downlink ports of the at least one first downlink port may be connected to the at least one storage unit 216 in a one-to-one correspondence, while the other first downlink ports may be idle. However, this is not limited in this embodiment of the present application.

In this embodiment of the present application, optionally, different storage devices 210 of the N storage devices 210 may include different quantities of processing units 212 and/or storage units 216, and switch units 214 of different storage devices 210 may include different quantities of uplink ports and/or downlink ports. This is not limited in this embodiment of the present application.

In this way, in the storage system 200 provided in this embodiment of the present application, the N storage devices 210 are connected in a head-to-tail way using switch units 214, forming a ring connection structure. Any two storage devices 210 of the N storage devices 210 may communicate with each other using the ring connection structure. Compared with that multiple storage devices in a storage system are directly connected in a pairwise way in the other approaches, in the present application, a quantity of physical links can be reduced, thereby reducing complexity and construction costs of the storage system 200.

Optionally, in this embodiment of the present application, there may be a connection link between at least one processing unit 212 of a storage device 210, and there may also be a connection link between at least two uplink ports of a switch unit 214. In an optional embodiment, if the storage device 210 is a PCIe storage device 210, an uplink port and a downlink port of the switch unit 214 may be PCIe ports. In this case, the processing unit 212 may be used as a primary PCIe device, and the storage unit 214 may be used as a secondary PCIe device. In addition, optionally, the at least two uplink ports may be connected using a non-transparent bridge, and the at least one processing unit 212 may be connected using a non-transparent bridge. However, this is not limited in this embodiment of the present application.

Optionally, the downlink port may be a shared downlink port that can be shared or a common downlink port that cannot be shared. There is a connection link or connection path between the common downlink port of the switch unit 214 and only one uplink port of the switch unit 214. Correspondingly, only one processing unit 212 of the storage device 210 can access the downlink port, and uses the downlink port to access a storage unit 216 connected to the downlink port. The processing unit 212 may be a processing unit 212 corresponding to an uplink port connected to the downlink port. However, there may be a connection link or connection path between the shared downlink port of the switch unit 214 and each uplink port of the switch unit 214. Correspondingly, all processing units 212 of the storage device 210 can access the shared downlink port, and set the shared downlink port to access a storage unit 216 connected to the shared downlink port such that the storage unit 216 can be shared by all the processing units 212 of the storage device 210. However, this is not limited in this embodiment of the present application.

In an optional embodiment, at least two downlink ports of the switch unit 214 all may be shared downlink ports. Correspondingly, there may be a connection link between any downlink port of the at least two downlink ports and any uplink port of the at least two uplink ports. In this way, any processing unit 212 of the storage device 210 may set the shared downlink port to access any storage unit 216 of the storage device 210 and set the ring connection structure to access any storage unit 216 of another storage device 210 such that a storage unit 216 can be accessed by any processing unit 212 in the storage system 200. In addition, a processing unit 212 may directly perform a read/write operation on any storage unit 216, with no need to interact with another processing unit 212, thereby simplifying a data read/write procedure of the processing unit 212, reducing processing resources of the processing unit 212, and improving data read/write efficiency. In addition, the processing unit 212 may manage all resources of each storage unit 216 in the storage system 200, helping to improve overall performance of the storage system 200.

In this embodiment of the present application, optionally, the processing unit 212 may scan for devices to find devices directly or indirectly connected to the processing unit 212, that is, to find devices that can be accessed by the processing unit 212. The devices that can be accessed by the processing unit 212 may include at least one switch unit 214, at least one storage unit 216, and another processing unit 212. The storage unit 216 may be used as a PCIe endpoint device. The switch unit 214 may be used as a bus and a bridge, and configured to connect a processing unit 212 and a storage unit 216. For example, an uplink port and a downlink port of the switch unit 214 may be used as buses, and a connection link between the uplink port and the downlink port of the same switch unit 214 may be used as a bridge. However, this is not limited in this embodiment of the present application.

The processing unit 212 may record, in a process of scanning for devices, information about each scanned device, for example, configuration information such as a device number of each device, record a connection relationship between all scanned devices, and generate a PCIe tree for the processing unit 212 according to the recorded connection relationship between all the scanned devices.

Optionally, the processing unit 212 may use a DFS algorithm to scan for devices. Further, when finding, by scanning, a device directly connected to the processing unit 212, the processing unit 212 may further scan for, in a downlink direction, devices directly connected to the directly connected device, until it is found that a current scanned device is not connected to another device in a downlink direction. In this case, the processing unit 212 may return to an upper-level device of the device that is not connected to another device. An upper-level device of a particular device may refer to a device that is located in an uplink direction of the particular device and that is connected to the particular device, that is, a device connected to an uplink port of the particular device. In addition, the processing unit 212 may scan for, in a downlink direction, devices that are connected to the upper-level device and that have not been scanned, and after all devices connected to the upper-level device have been scanned, return to an upper-level device of the upper-level device and continue scanning, until all devices directly or indirectly connected to the processing unit 212 in the storage system 200 have been scanned.

In this embodiment of the present application, optionally, when finding, by scanning, a device connected to the processing unit 212, the processing unit 212 may determine whether the device is scanned for the first time, that is, determining whether the device was once scanned, where the device may be a switch unit 214 or a storage unit 216 in the storage system 200. Optionally, if the device is scanned for the first time, the processing unit 212 may record the device and a connection relationship between the device and another scanned device, and continue scanning in a downlink direction of the device. Optionally, if the device is not scanned for the first time, that is, the device has been scanned before, the processing unit 212 may stop scanning in a downlink direction of the device, and return to an uplink direction of the device for scanning, that is, returning to a device connected to an uplink port of the device for scanning. In this way, the processing unit 212 can be prevented from performing repeated and infinite scanning in the ring connection structure.

Furthermore, if the current scanned device has been scanned by the processing unit 212 before, the processing unit 212 may return to an upper-level switch unit 214 connected to the current scanned device, and scan for devices that are connected to the upper-level switch unit and that have not been scanned. Optionally, after all devices connected to the upper-level switch unit 214 have been scanned, the processing unit 212 may return to an upper-level switch unit 214 connected to an uplink port of the upper-level switch unit connected to all the devices, and scan for devices that have not been scanned, until all devices directly or indirectly connected to the processing unit 212 in the storage system 200 have been scanned.

Optionally, the device that is repeatedly scanned (that is, the device that has been scanned by the processing unit 212 before) may be a switch unit 214 directly connected to the processing unit 212. However, this is not limited in this embodiment of the present application.

Optionally, if the device is repeatedly scanned, that is, the device is not scanned for the first time, the processing unit 212 may further record the repeated scan information, for example, recording information about the device that is repeatedly scanned. The information about the device that is repeatedly scanned may include a device number of the device that is repeatedly scanned and/or a connection relationship between the device that is repeatedly scanned and another device, and the like. However, this is not limited in this embodiment of the present application.

Optionally, the processing unit 212 may determine, in multiple manners, whether a device connected to the processing unit 212 is scanned for the first time. In an optional embodiment, the processing unit 212 may determine whether a device address has been assigned to a scanned device. Optionally, if no device address has been assigned to the scanned device, the processing unit 212 may determine that the device is scanned for the first time. In this case, optionally, the processing unit 212 may assign a device address to the scanned device and add the assigned device address to a device address set corresponding to the processing unit 212. The device address set for the processing unit 212 may include a device address assigned to each device of at least one scanned device by the processing unit 212. The device address assigned to each device may be assigned by the processing unit 212, or may be assigned by another processing unit 212 in the storage system. This is not limited in this embodiment of the present application.

Optionally, if a device address has been assigned to the scanned device, it indicates that the processing unit 212 or another processing unit 212 in the storage system 200 once found the device by scanning. In this case, the processing unit 212 may further determine whether the device address of the device is assigned by the processing unit 212. If the device address of the device is assigned by the processing unit 212, it indicates that the processing unit 212 once found the device by scanning, and the processing unit 212 may return to an uplink direction of the device for scanning. Optionally, if the device address of the device is assigned by another processing unit 212, the processing unit 212 may add the device address of the device to a device address set for the processing unit 212, and continue scanning in a downlink direction of the device. However, this is not limited in this embodiment of the present application.

In this embodiment of the present application, the processing unit 212 may determine, in multiple manners, whether a device address has been assigned to the scanned device. Optionally, the processing unit 212 may obtain an address of the device from configuration space of the scanned device, and may determine, according to the obtained address, whether a device address has been assigned to the scanned device. Further, if the obtained address is a default address, the processing unit 212 may determine that no device address is assigned to the device. The default address may be a fixed address, and the default address may be preconfigured by a device manufacturer or preconfigured by a storage system in another manner. For example, the default address may be a numeric string consisting of multiple 0s and 1s or a character string consisting of multiple characters F. This is not limited in this embodiment of the present application.

Optionally, if the obtained address is not a default address, it indicates that a device address has been assigned to the device. In this case, the processing unit 212 may further determine whether the obtained address is assigned by the processing unit 212. For example, the processing unit 212 may match the obtained address with at least one device address included in an assigned-address set for the processing unit 212 to determine whether the assigned-address set includes the obtained address. If the assigned-address set includes the obtained address, it indicates that the obtained address is assigned by the processing unit 212, that is, the processing unit 212 once found the device by scanning. In this case, the processing unit 212 may return to an uplink device connected to the current scanned device and continue scanning. Optionally, if the assigned-address set does not include the obtained address, it indicates that the obtained address is assigned by another processing unit in the storage system, and the processing unit 212 finds the device by scanning for the first time. However, this is not limited in this embodiment of the present application.

In an optional embodiment, the processing unit 212 may be configured to scan for devices connected in a downlink direction to the current scanned device. The connected device may include at least one of a switch unit 214, a storage unit 216, or a processing unit 212. If a device connected to the current device is scanned, the processing unit 212 may obtain an address of the scanned device. If the address is not a default address, the processing unit 212 may determine whether the address exists in an assigned-address set for the processing unit 212. The assigned-address set for the processing unit 212 includes a device address assigned to each device of at least one device that has been scanned by the processing unit 212. Optionally, if the address exists in the assigned-address set, the processing unit 212 may return to the current device and continue scanning in order to determine whether the current device is further connected to a device that has not been scanned. Optionally, in another embodiment, if the address does not exist in the assigned-address set, the processing unit 212 may continue to scan for, in a downlink direction, devices connected to the scanned device. Further, if the current scanned device is a switch unit 214, the processing unit 212 may continue to scan for devices connected to a downlink port of the switch unit 214. If the current scanned device is a PCIe endpoint device, for example, a storage unit 216, the processing unit 212 may determine that the PCIe endpoint device is not connected to another device, return to the current device, and continue scanning in order to determine whether the current device is connected to another device that has not been scanned. This is not limited in this embodiment of the present application.

Figure 3:
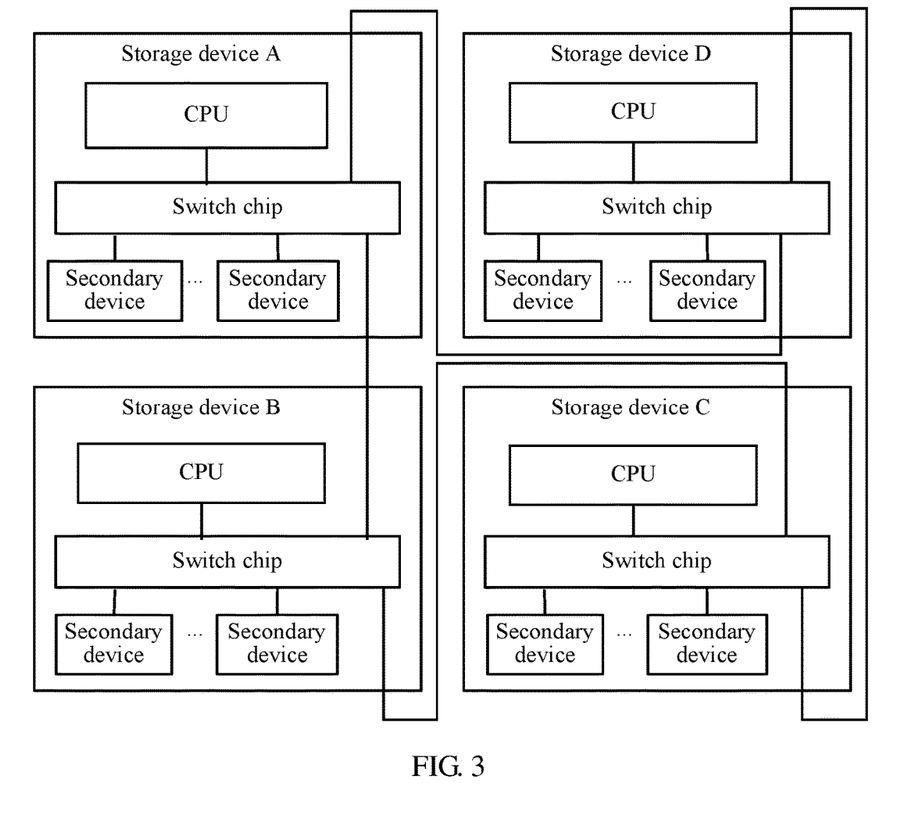
FIG. 3 is a schematic diagram of an example of a storage system according to an embodiment of the present application.

As an example, a PCIe storage system shown in FIG. 3 may include four storage devices, a storage device A, a storage device B, a storage device C, and a storage device D. Each storage device includes one CPU, a switch chip, and at least one secondary device. The at least one secondary device may be at least one storage unit. The switch chip may be a PCIe switch chip, and the switch chip may have multiple PCIe uplink ports (not shown) and multiple PCIe downlink ports (not shown). A first uplink port of the multiple PCIe uplink ports is connected to the CPU, and at least one first PCIe downlink port of the multiple PCIe downlink ports may be connected to the at least one secondary device in a one-to-one correspondence. The secondary device may be a shared secondary device. That is, the secondary device can be shared by the CPU of the storage device. In addition, a second downlink port of a PCIe switch chip in the storage device A is connected to a second uplink port of a PCIe switch chip in the storage device B, a second downlink port of the PCIe switch chip in the storage device B is connected to a second uplink port of a PCIe switch chip in the storage device C, a second downlink port of the PCIe switch chip in the storage device C is connected to a second uplink port of a PCIe switch chip in the storage device D, and a second downlink port of the PCIe switch chip in the storage device D is connected to a second uplink port of the PCIe switch chip in the storage device A.

When a CPU of the storage device A scans for devices, the CPU of the storage device A may be used as a root node of a PCIe tree. The CPU of the storage device A may first find, by scanning, the switch chip of the storage device A that is directly connected to the CPU. If no device address has been assigned to the switch chip of the storage device A yet, after a device address has been assigned to the switch chip of the storage device A, the assigned device address is recorded in a device address set for the CPU of the storage device A, and a connection relationship between the switch chip of the storage device A and the CPU may be recorded. Then, the CPU of the storage device A may scan for, in a preset sequence and in the same manner as that for scanning for the switch chip of the storage device A, devices connected to another uplink port and downlink port of the switch chip. When a switch chip of the storage device B connected to the downlink port is scanned, devices connected to an uplink port and a downlink port of the switch chip of the storage device B may be scanned for. In this case, even if not all devices connected to the switch chip of the storage device A have been scanned, remaining devices connected to the switch chip of the storage device A are no longer scanned for. Similarly, when the devices connected to the uplink port and the downlink port of the switch chip of the storage device B are being scanned for, if it is determined, by scanning, that a device connected to the downlink port is a switch chip of the storage device C, remaining devices connected to the switch chip of the storage device B are no longer scanned for, but devices connected to the switch chip of the storage device C are to be scanned for. By analogy, when devices connected to the switch chip of the storage device D are being scanned for, if it is determined, by scanning, that a device connected to a downlink port of the switch chip of the storage device D is the switch chip of the storage device A, because the switch chip of the storage device A has been scanned before, a device address of the switch chip of the storage device A already exists in the device address set, that is, a repeated device address appears. In this case, a connection relationship between the switch chip of the storage device A and the switch chip of the storage device D may be recorded, then scanning returns to the switch chip of the storage device D that is connected to an uplink port of the switch chip of the storage device A, and devices that are connected to the switch chip of the storage device D and that have not been scanned before are to be scanned for, and so on, until scanning returns to the switch chip of the storage device A and a device that is connected to the switch chip of the storage device A and that has not been scanned before is being scanned for. After scanning for the devices connected to the switch chip of the storage device A is completed, scanning for the devices that can be accessed by the CPU of the storage device A is completed, and the PCIe tree (shown in FIG. 4) for the CPU of the storage device A is generated according to a connection relationship between devices scanned that is recorded in the foregoing process of scanning for devices. In addition, to subsequently verify whether the PCIe tree is correctly created, a connection relationship with the CPU of the storage device A may be established in the switch chip of the storage device A at a tail end of the PCIe tree.

Figure 4:
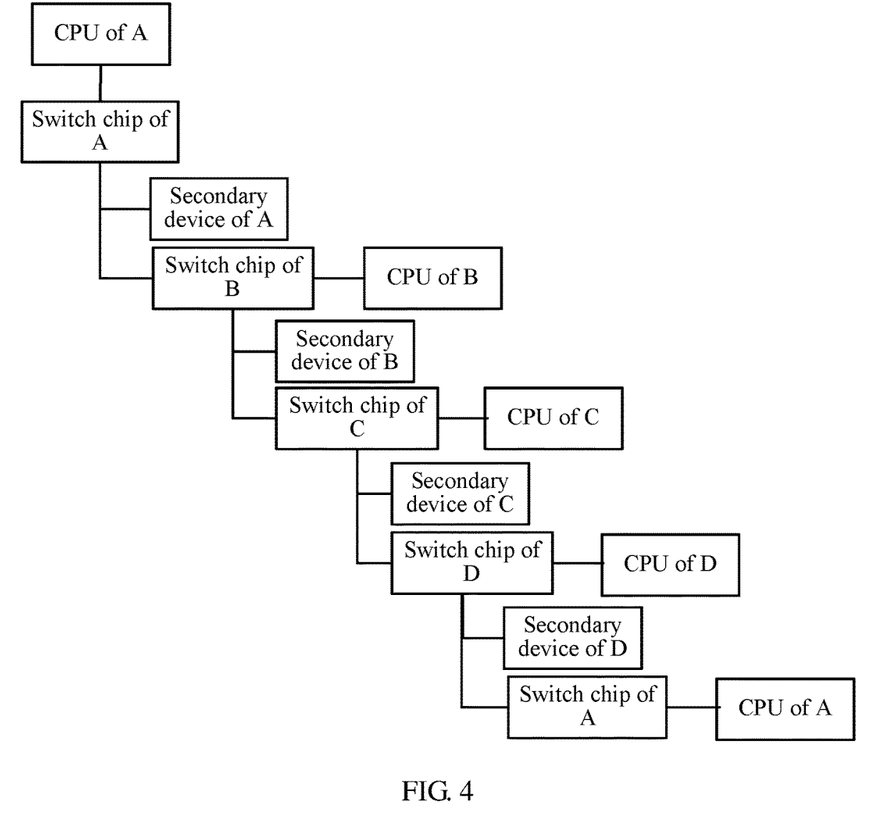
FIG. 4 is a schematic diagram of a PCIe tree created by a central processing unit (CPU) of a storage device A in the example of the storage system shown in FIG. 3.

As shown in FIG. 4, in the PCIe tree corresponding to the CPU of the storage device A, either a root node or an outermost leaf node may be the CPU itself. A distance between the outermost leaf node and the root node is the farthest, and correspondingly, the most nodes need to be traversed before arrival at the root node.

It should be understood that examples in FIG. 3 and FIG. 4 are only intended to help a person skilled in the art to better understand this embodiment of the present application, but not to limit the scope of this embodiment of the present application. According to the examples provided in FIG. 3 and FIG. 4, a person skilled in the art can make various equivalent modifications or variations, and these modifications or variations also fall within the scope of this embodiment of the present application.

In this embodiment of the present application, optionally, after generating, in the foregoing process of scanning for devices, the PCIe tree corresponding to the CPU of A, the CPU of A may further perform verification processing on the generated PCIe tree to determine whether the created PCIe tree is correct.

In an optional embodiment, the CPU of A may send a verification message. A destination address for the verification message is a device address of an outermost leaf node device in the PCIe tree. That is, the CPU of A sends the verification message to the outermost leaf node in the PCIe tree using an uplink port of switch chip of A connected to the CPU of A. The outermost leaf node may be a node farthest from the CPU of A in the PCIe tree, and a largest quantity of nodes need to be traversed between the outermost leaf node and CPU of A. It can be seen from the example of the PCIe tree shown in FIG. 4, if the CPU of A creates a correct PCIe tree, an outermost leaf node device in the PCIe tree may be CPU of A itself. Therefore, if the CPU of A can receive the verification message sent by itself, it indicates that the PCIe tree is created successfully. If the CPU of A does not receive the verification message, it indicates that the PCIe tree is incorrect, and the CPU of A needs to create a new PCIe tree or correct the created PCIe tree. This is not limited in this embodiment of the present application.

Optionally, when sending the verification message, the CPU of A may further set a timer, and determine whether the verification message is received before the timer expires. If the verification message is received before the timer expires, it indicates that the PCIe tree is created correctly. However, this is not limited in this embodiment of the present application.

In an optional embodiment, if the CPU of A does not receive the verification message or does not receive the verification message before the timer expires, the CPU of A may search for a device that is repeatedly scanned in the process of creating the PCIe tree, for example, the CPU of A may look up recorded repeated scan information to determine the device that is repeatedly scanned. The CPU of A may assign, to the device repeatedly scanned, a new device address different from a current device address of the device, and may set the device repeatedly scanned as a start point to continue scanning in order to create a new PCIe tree. After the CPU of A creates the new PCIe tree, the new PCIe tree may be further verified using the foregoing procedure, and the process is repeated until the CPU of A determines that a PCIe tree created by the processing unit is correct. However, this is not limited in this embodiment of the present application.

The storage system provided in the embodiments of the present application is described in detail in the foregoing with reference to FIG. 2 to FIG. 4. A method for scanning for devices in a storage system according to an embodiment of the present application is described below with reference to FIG. 5 and FIG. 6.

Figure 5:
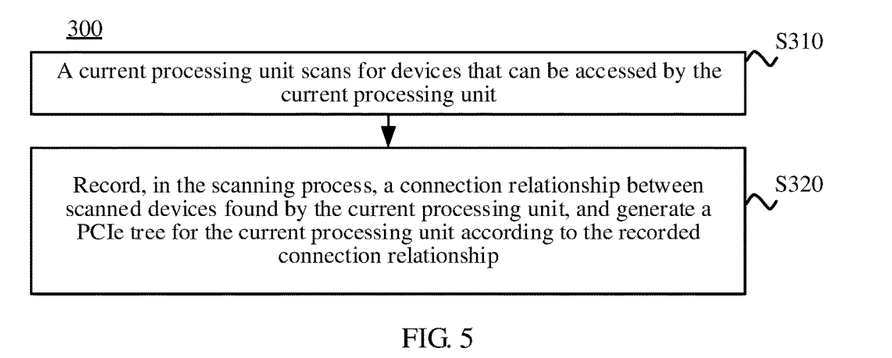
FIG. 5 is a schematic flowchart of a method for scanning for devices according to an embodiment of the present application.

FIG. 5 shows a method 300 for scanning for devices according to an embodiment of the present application. The method 300 may be applied to the storage system 200 in the foregoing embodiment. Optionally, the method 300 may be executed by a processing unit of a storage device. For ease of understanding, an entity that executes the method 300 is referred to as a current processing unit in the following. The current processing unit may be located in any storage device in the storage system. This is not limited in this embodiment of the present application.

Step S310: The current processing unit scans for devices that can be accessed by the current processing unit.

Optionally, the devices that can be accessed by the current processing unit may include a device directly or indirectly connected to the current processing unit, and may include a switch unit directly or indirectly connected to the current processing unit and a device or devices connected to the switch unit, for example, a storage unit and/or a processing unit.

Optionally, the current processing unit may perform scanning according to a DFS.

Optionally, when the current processing unit finds, by scanning, the device directly or indirectly connected to the current processing unit, if the device is scanned for the first time, the current processing unit may continue to scan for, in a downlink direction, devices connected to the scanned device.

Optionally, if the current processing unit repeatedly finds the device by scanning, that is, the scanned device has scanned by the current processing unit before, the current processing unit may return to a device connected to an uplink end of the device repeatedly scanned and continue scanning. That is, the current processing unit may return to an uplink branch of the device repeatedly scanned and perform scanning. Further, if a switch unit is repeatedly scanned, the current processing unit may return to a device connected to an uplink port of the switch unit repeatedly scanned and perform scanning, or if a storage unit or a processing unit is repeatedly scanned, the current processing unit may return to a switch unit connected to the storage unit or the processing unit repeatedly scanned and perform scanning.

Optionally, if a scanned device currently has been scanned by the current processing unit before, the current processing unit may determine that the scanned device currently is a switch unit directly connected to the current processing unit.

Optionally, if a scanned device has been scanned by the current processing unit before, the current processing unit may return to an upper-level switch unit connected to an uplink port of the currently scanned device, and scan for devices that are connected to the upper-level switch unit and that have not been scanned.

Optionally, if all devices connected to the upper-level switch unit have been scanned, the current processing unit may return to an upper-level switch unit connected to an uplink port of the upper-level switch unit connected to all the devices, and perform scanning to find a device that has not been scanned. The process is repeated until all devices connected to all switch units in the storage system have been scanned.

Optionally, if the current processing unit repeatedly finds the device by scanning, the current processing unit may further record repeated scan information, for example, information about the device repeatedly scanned, such as a device address or device number of the device repeatedly scanned and a connection relationship between the device repeatedly scanned and another device. However, this is not limited in this embodiment of the present application.

Optionally, the current processing unit may further determine whether a device address has been assigned to the scanned device, if a device address has been assigned to the scanned device, determine whether the device address assigned to the scanned device exists in a device address set corresponding to the current processing unit, where the device address set corresponding to the current processing unit includes a device address assigned to each device of at least one device that has been scanned by the current processing unit, and if the device address assigned to the scanned device exists in the device address set corresponding to the current processing unit, determine that the scanned device was once scanned by the current processing unit.

Optionally, if no device address has been assigned to the scanned device, the current processing unit may assign a device address to the scanned device, and add the assigned device address to the device address set corresponding to the current processing unit. In this case, optionally, the current processing unit may scan for, in a downlink direction, devices connected to the scanned device.

Optionally, if the device address assigned to the scanned device does not exist in the device address set corresponding to the current processing unit, the current processing unit may add, to the device address set corresponding to the current processing unit, the device address assigned to the scanned device. In this case, optionally, the current processing unit may scan for, in a downlink direction, devices connected to the scanned device.

Step S320: Record, in the scanning process, a connection relationship between scanned devices found by the current processing unit, and generate a PCIe tree for the current processing unit according to the recorded connection relationship.

In another optional embodiment, after step S320, the method 300 may further include sending a verification message, where a destination address for the verification message is a device address of an outermost leaf node device in the PCIe tree, a root node in the PCIe tree is the current processing unit, and the outermost leaf node in the PCIe tree is a node farthest from the current processing unit in the PCIe tree, and determining that the PCIe tree has been created successfully if the current processing unit receives the verification message.

In another optional embodiment, the method 300 may further include creating a new PCIe tree for the current processing unit if the current processing unit does not receive the verification message.

Optionally, when the new PCIe tree for the current processing unit is created, the current processing unit may determine a device repeatedly scanned in a scanning process used to generate the PCIe tree, assign, to the device repeatedly scanned, a new device address different from a current device address of the device repeatedly scanned, and replace the current device address with the new device address in the device address set corresponding to the current processing unit, and set the device repeatedly scanned as a start point to scan for devices connected to the device repeatedly scanned, record, in the scanning process, a connection relationship between scanned devices, and generate the new PCIe tree for the current processing unit according to the recorded connection relationship between scanned devices.

Therefore, according to the method for scanning for devices according to this embodiment of the present application, when a scanned device has been scanned by a current processing unit before, the current processing unit stops scanning for the device, returns to an uplink device of the scanned device, and performs scanning, where the uplink device of the scanned device may be a device connected in an uplink direction to the scanned device. This can avoid that the current processing unit falls into an infinite scanning loop due to scanning for a device for multiple times in a process of scanning for devices and that an incorrect PCIe tree is created due to repeated scanning, and therefore, improves efficiency and accuracy of scanning for devices.

More detailed descriptions of a method for scanning for devices according to an embodiment of the present application are provided below with reference to specific examples. It should be noted that these examples are only intended to help a person skilled in the art to better understand this embodiment of the present application, but not to limit the scope of this embodiment of the present application.

Figure 6:
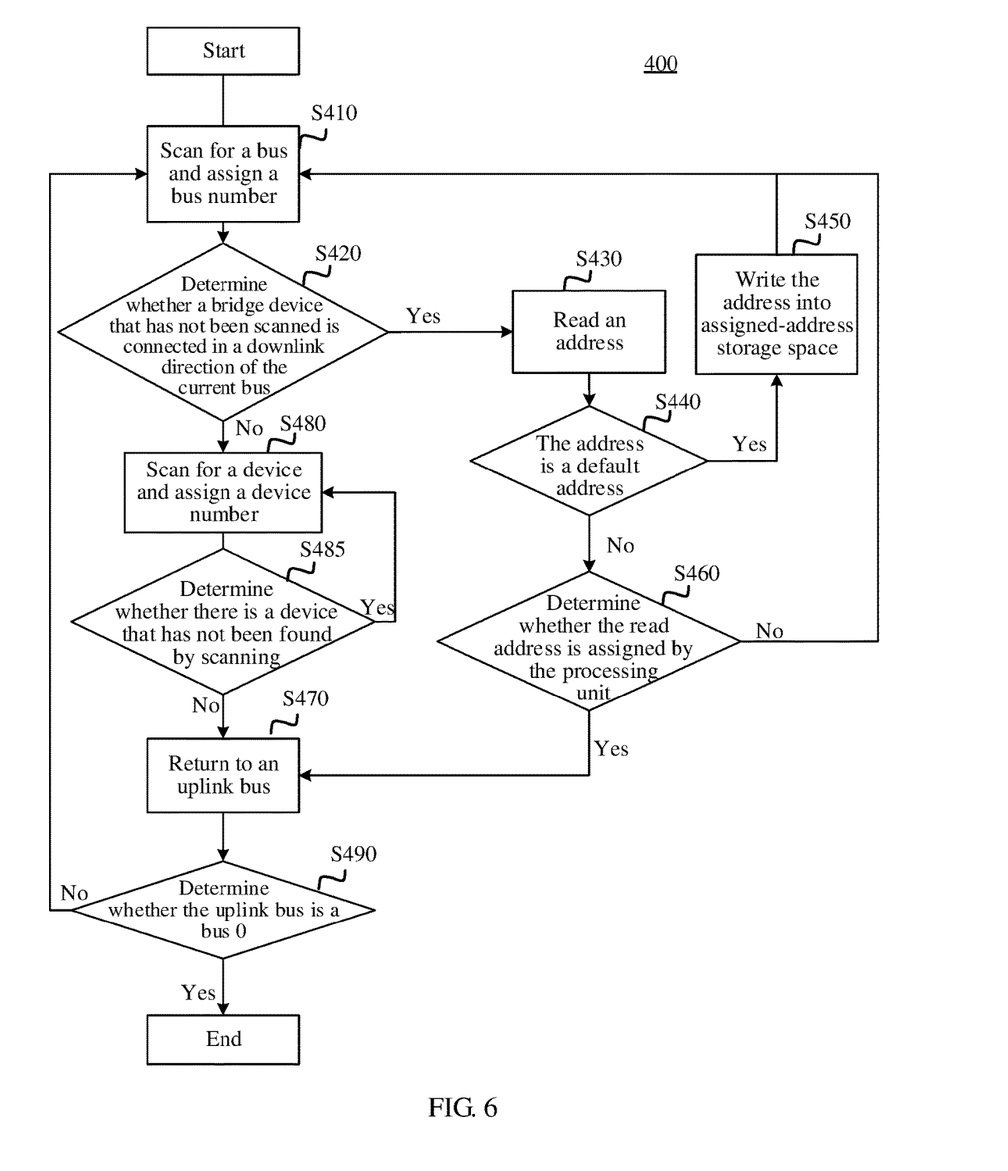
FIG. 6 is a schematic flowchart of a method for scanning for devices according to another embodiment of the present application.

FIG. 6 is a schematic flowchart of a method 400 for scanning for devices according to another embodiment of the present application.

In step S410, a processing unit scans for a bus connected to the processing unit, and assigns a bus number to the scanned bus.

Further, a bus directly connected to the processing unit is defined as a bus 0, and scanned buses are sequentially numbered. However, this is not limited in this embodiment of the present application.

In step S420, the processing unit determines whether a bridge device that has not been scanned is connected in a downlink direction of the current bus. The bridge device that has not been scanned may be a unique bridge device connected in the downlink direction of the current bus, or may be a bridge device other than a bridge device that is connected in the downlink direction of the current bus and that has been scanned.

Optionally, if there is no bridge device that is in the downlink direction of the current bus and that has not been scanned, the processing unit may perform step S480. If there is a bridge device that is in the downlink direction of the current bus and that has not been scanned, the processing unit may perform step S430.

In step S430, the processing unit may read an address of a bridge scanned device currently, and in step S440, determine whether the read address is a default address. If the read address is the default address, the processing unit may perform step S450, that is, writing the read address into assigned-address storage space, and continuing to perform scanning to determine whether a device that has not been scanned is connected in the downlink direction of the current bus. Optionally, if the read address is not the default address, the processing unit may perform step S460.

In step S460, the processing unit may determine whether the read address is assigned by the processing unit. Further, the processing unit may compare the read address with the device address stored in the assigned-address storage space to determine whether the read address exists in the assigned-address storage space. If the read address exists in the assigned-address storage space, it indicates that the read address is assigned by the processing unit, and if the read address does not exist in the assigned-address storage space, it indicates that the read address is not assigned by the processing unit. Optionally, the processing unit may further use another manner to determine whether the read address is assigned by the processing unit, and this is not limited in this embodiment of the present application. In step S480, the processing unit scans for a device connected to the processing unit, and assigns a device number to the scanned device. In step S485, the processing unit determines whether there is a device that has not been found by scanning. Perform step S480 if there is a device and perform step S470 if there is no device found by scanning.

Optionally, if the processing unit determines that the read address is assigned by the processing unit, the processing unit may perform steps S470 and S490, that is, interrupting further scanning for a current bridge device, and returning to an uplink bus of the current bridge device to perform scanning. In step S490 if the uplink bus is the bus 0, the processing unit may end the process of scanning for devices. If the uplink bus is not the bus 0, the processing unit may perform S410.

Optionally, if the processing unit determines that the read address is not assigned by the processing unit, the processing unit may perform S410, that is, continuing to scan for a downlink bus of the bridge device. However, this is not limited in this embodiment of the present application.

It should be noted that the example in FIG. 6 is only intended to help a person skilled in the art to better understand this embodiment of the present application, but not to limit the scope of this embodiment of the present application. According to the provided example in FIG. 6, a person skilled in the art can make various equivalent modifications or variations, and these modifications or variations also fall within the scope of this embodiment of the present application.

It should be understood that, sequence numbers of the foregoing processes do not mean execution sequences. The execution sequences of the processes should be determined according to functions and internal logic of the processes, and should not be construed as any limitation on the implementation processes of the embodiments of the present application.

It should be further understood that the descriptions provided above for the embodiments focus on emphasizing a difference between the embodiments, and for the same or similar content of the embodiments, reference may be made to each other. For simplicity, details are not further described herein.

It should be further understood that the terms "system" and "network" may be used interchangeably in this specification. The term "and/or" in this specification describes only an association relationship for describing associated objects and represents that three relationships may exist. For example, A and/or B may represent the following three cases Only A exists, both A and B exist, and only B exists. In addition, the character "/" in this specification generally indicates an "or" relationship between the associated objects. The term "multiple" generally indicates at least two, that is, two or more than two.

A person of ordinary skill in the art may be aware that method steps and units in the examples described with reference to embodiments disclosed in this specification may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is only exemplary. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are only specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A storage system, comprising:
N storage devices coupled in a ring shape,
wherein each storage device comprises:
at least one processor;
a switch coupled to the at least one processor and comprising at least two uplink ports and at least two downlink ports; and
at least one storage unit coupled to the switch,
wherein the at least two uplink ports comprise at least one first uplink port and a second uplink port,
wherein the at least one processor is coupled to the at least one first uplink port,
wherein the at least two downlink ports comprise at least one first downlink port and a second downlink port, wherein the at least one storage unit is coupled to the at least one first downlink port,
wherein a second downlink port of an $i^{th}$ storage device is coupled to a second uplink port of an $(i+1)^{th}$ storage device,
wherein a second downlink port of an $N^{th}$ storage device is coupled to a second uplink port of a first storage device,
wherein i and N are both positive integers,
wherein N is greater than or equal to 2,
wherein i is any integer from 1 to N−1,
wherein each processor of each storage device is configured to:
scan for devices that are accessible by the processor, wherein the devices that are accessible by the processor comprise the N storage devices coupled in the ring shape;
record, during the scanning process, a coupling relationship between the processor and each of the N storage devices coupled in the ring shape; and
generate a peripheral component interconnect express (PCIe) tree for the processor according to the recorded coupling relationships, wherein the PCIe tree comprises a root node that is the processor, an outer leaf that is the processor, and each of the N storage devices coupled in the ring shape between the root node and the outer leaf.

2. The storage system of claim 1, further comprising a coupling link between any downlink port of the at least two downlink ports and any uplink port of the at least two uplink ports.

3. The storage system of claim 1, wherein each uplink port of the at least two uplink ports is a PCIe uplink port, and wherein each downlink port of the at least two downlink ports is a PCIe downlink port.

4. The storage system of claim 1, wherein during the scanning process, each processor is configured to:
scan for, according to a depth-first search (DFS) algorithm, devices directly coupled to the processor;
determine that a scanned device is a switch directly coupled to the processor, return to an upper-level switch coupled to an uplink port of the switch directly coupled to the processor, and scan for devices that are coupled to the upper-level switch but have not been scanned when the scanned device has been scanned by the processor before; and
return to an upper-level switch coupled to an uplink port of the upper-level switch whose coupled devices are all scanned to scan for devices that have not been scanned, until all devices coupled to all switches in the storage system have been scanned after all devices coupled to the upper-level switch have been scanned.

5. The storage system of claim 1, wherein during the scanning process, each processor is configured to:
scan for, according to a depth-first search (DFS) algorithm, devices indirectly coupled to the processor;
determine that a scanned device is a switch directly coupled to the processor, return to an upper-level switch coupled to an uplink port of the switch directly coupled to the processor, and scan for devices that are coupled to the upper-level switch but have not been scanned when the scanned device has been scanned by the processor before; and
return to an upper-level switch coupled to an uplink port of the upper-level switch whose coupled devices are all scanned to scan for devices that have not been scanned, until all devices coupled to all switches in the storage system have been scanned after all devices coupled to the upper-level switch have been scanned.

6. The storage system of claim 4, wherein each processor corresponds to a device address set configured to record device addresses of scanned devices scanned by each processor, and wherein when the scanned device has been scanned by the processor before, the processor is further configured to:
determine whether a device address has been assigned to the scanned device;
determine whether the device address assigned to the scanned device exists in a device address set corresponding to the processor when the device address has been assigned to the scanned device; and
determine that the scanned device has been scanned by the processor before when the device address assigned to the scanned device exists in the device address set corresponding to the processor.

7. The storage system of claim 5, wherein each at least one processor corresponds to a device address set configured to record device addresses of scanned devices scanned by each at least one processor, and wherein when the scanned device has been scanned by the processor before, the processor is further configured to:
determine whether a device address has been assigned to the scanned device;
determine whether the device address assigned to the scanned device exists in a device address set corresponding to the processor when the device address has been assigned to the scanned device; and
determine that the scanned device has been scanned by the processor before when the device address assigned to the scanned device exists in the device address set corresponding to the processor.

8. The storage system of claim 6, wherein the processor is further configured to:
assign the device address to the scanned device, and add the assigned device address to the device address set corresponding to the processor when no device address has been assigned to the scanned device; and
add, to the device address set corresponding to the processor, the device address assigned to the scanned device when the device address assigned to the scanned device does not exist in the device address set corresponding to the processor.

9. The storage system of claim 7, wherein the processor is further configured to:
assign the device address to the scanned device, and add the assigned device address to the device address set corresponding to the processor when no device address has been assigned to the scanned device; and
add, to the device address set corresponding to the processor, the device address assigned to the scanned device when the device address assigned to the scanned device does not exist in the device address set corresponding to the processor.

10. A method for scanning for devices, applied to a storage system, comprising:
scanning for devices accessible by a scanning processor performing the scanning operation;
recording, during the scanning process, a coupling relationship between devices scanned by the scanning processor; and
generating a peripheral component interconnect express (PCIe) tree for the scanning processor according to the recorded coupling relationship, wherein the storage system comprises N storage devices coupled in a ring shape, wherein the PCIe tree comprises a root node that is the scanning processor, an outer leaf that is the scanning processor, and each of the N storage devices coupled in the ring shape between the root node and the outer leaf, wherein each storage device comprises at least one processor, a switch, and at least one storage unit, wherein the switch comprises at least two uplink ports and at least two downlink ports, wherein the at least two uplink ports comprise at least one first uplink port and a second uplink port, wherein the at least one processor is coupled to the at least one first uplink port, wherein the at least two downlink ports comprise at least one first downlink port and a second downlink port, wherein the at least one storage unit is coupled to the at least one first downlink port, wherein a second downlink port of an $i^{th}$ storage device is coupled to a second uplink port of an $(i+1)^{th}$ storage device, wherein a second downlink port of an $N^{th}$ storage device is coupled to a second uplink port of a first storage device, wherein i and N are both positive integers wherein N is greater than or equal to 2, and wherein i is any integer from 1 to N−1.

11. The method for scanning for devices of claim 10, wherein scanning for the devices accessible by the scanning processor comprises:

scanning for, according to a depth-first search (DFS) algorithm, devices directly coupled to the scanning processor;

determining that a scanned device is a switch directly coupled to the scanning processor, returning to an upper-level switch coupled to an uplink port of the switch directly coupled to the scanning processor, and scanning for devices that are coupled to the upper-level switch and that have not been scanned When the scanned device has been scanned by the scanning processor before; and returning to an upper-level switch connected to an uplink port of the upper-level switch coupled to all the devices, and scanning for devices that have not been scanned, until all devices coupled to all switches in the storage system have been scanned after all devices coupled to the upper-level switch have been scanned.

12. The method for scanning for devices of claim 10, wherein scanning for the devices accessible by the scanning processor comprises:

scanning for, according to a depth-first search (DFS) algorithm, devices indirectly coupled to the scanning processor;

determining that a scanned device is a switch directly coupled to the scanning processor, returning to an upper-level switch couple to an uplink port of the switch directly coupled to the scanning processor, and scanning for devices that are coupled to the upper-level switch and that have not been scanned when the scanned device has been scanned by the scanning processor before; and returning to an upper-level switch coupled to an uplink port of the upper-level switch coupled to all the devices, and scanning for devices that have not been scanned, until all devices coupled to all switches in the storage system have been scanned after all devices coupled to the upper-level switch have been scanned.

13. The method for scanning for devices of claim 11, wherein determining that the scanned device has been scanned by the scanning processor before comprises:

determining whether a device address has been assigned to the scanned device;

determining whether the device address assigned to the scanned device exists in a device address set corresponding to the scanning processor when the device address has been assigned to the scanned device, wherein the device address set corresponding to the scanning processor comprises a device address assigned to each device of at least one device that has been scanned by the scanning processor; and determining that the scanned device has been scanned by the scanning processor when the device address assigned to the scanned device exists in the device address set corresponding to the scanning processor.

14. The method for scanning for devices of claim 12, wherein determining that the scanned device has been scanned by the scanning processor before comprises:

determining whether a device address has been assigned to the scanned device;

determining whether the device address assigned to the scanned device exists in a device address set corresponding to the scanning processor when the device address has been assigned to the scanned device, wherein the device address set corresponding to the scanning processor comprises a device address assigned to each device of at least one device that has been scanned by the scanning processor; and determining that the scanned device has been scanned by the scanning processor when the device address assigned to the scanned device exists in the device address set corresponding to the scanning processor.

15. The method for scanning for devices of claim 13, wherein scanning for the devices accessible by the scanning processor further comprises:

assigning the device address to the scanned device, and adding the assigned device address to the device address set corresponding to the scanning processor when no device address has been assigned to the scanned device; and adding, to the device address set corresponding to the scanning processor, the device address assigned to the scanned device when the device address assigned to the scanned device does not exist in the device address set corresponding to the scanning processor.

16. The method for scanning for devices of claim 14, wherein scanning for the devices accessible by the scanning processor further comprises:

assigning the device address to the scanned device, and adding the assigned device address to the device address set corresponding to the scanning processor when no device address has been assigned to the scanned device; and adding, to the device address set corresponding to the scanning processor, the device address assigned to the scanned device when the device address assigned to the scanned device does not exist in the device address set corresponding to the scanning processor.

17. The storage system of claim 1, wherein the PC le tree comprises distances between the processor and each other one of the N storage devices coupled in the ring shape, and wherein a distance between the root node that is the processor and the outer leaf that is the processor is the longest distance comprised in the PCIe tree.

18. The storage system of claim 1, wherein the processor is further configured to perform verification processing to determine that the PCIe tree is an accurate representation of the ring shape.

19. The method of claim 10, wherein the PCIe tree comprises distances between the scanning processor and each other one of the N storage devices coupled in the ring shape, and wherein a distance between the root node that is the scanning processor and the outer leaf that is the scanning processor is the longest distance comprised in the PCIe tree.

20. The method of claim 10, wherein the scanning processor is further configured to perform verification processing to determine that the PCIe tree is an accurate representation of the ring shape.

\* \* \* \* \*